Figure 1:
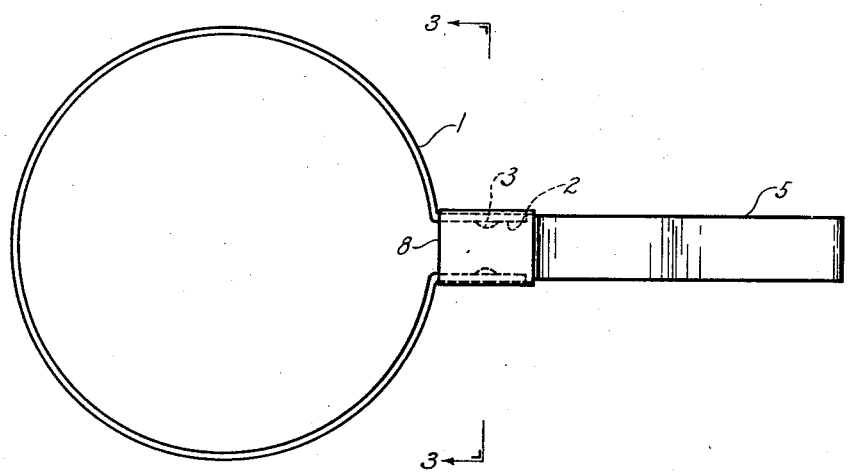

Dec. 15, 1942.       L. POGLEIN                 2,305,492
                 SCREWLESS HANDLE CLAMP
                   Filed Jan. 27, 1942

INVENTOR.
                                        Louis Poglein
                         BY             William B. Jaspert
                                          attorney.

Patented Dec. 15, 1942

2,305,492

UNITED STATES PATENT OFFICE 2,305,492

SCREWLESS HANDLE CLAMP

Louis Poglein, Jeannette, Pa., assignor to McKee Glass Company, Jeannette, Pa., a corporation of Pennsylvania Application January 27, 1942, Serial No. 428,411

3 Claims. (Cl. 294—27)

This invention relates to new and useful improvements in a combination spring band, handle and handle bracket, and attaching clamp for use in handling food containers such as pots and pans, and particularly glass containers.

It is among the objects of the invention to provide a combination container bracket, handle and clamp constructed to facilitate their assembly and attachment to a container without the need of screws or other attaching means.

Figure 2:
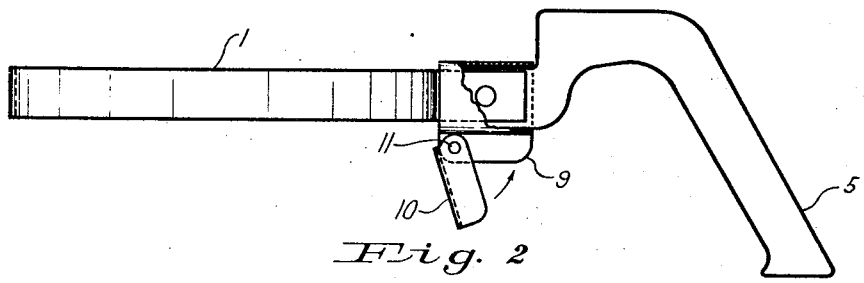
Figures 3, 4:
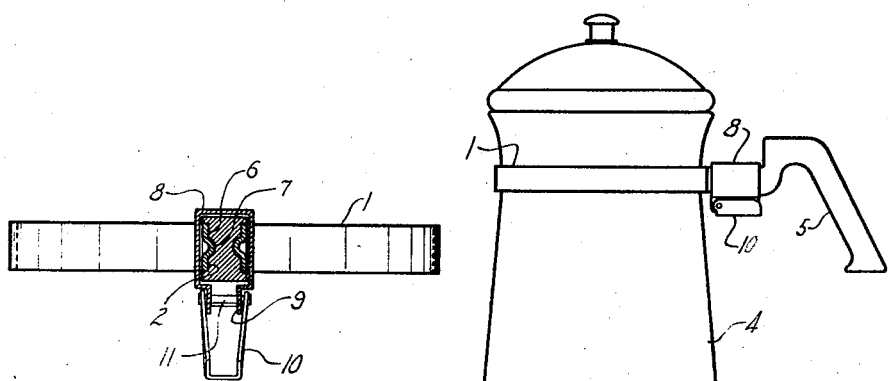

Further objects of the invention will become more apparent from a consideration of the accompanying drawing constituting a part hereof in which like reference characters designate like parts and in which:

Fig. 1 is a top plan view of a bracket, handle and clamp embodying the principles of this invention;

Fig. 2 a side elevational view with a portion of the clamp broken away;

Fig. 3 a cross-section taken along the line 3—3, Fig. 1; and

Fig. 4 a side elevation of a glass coffee maker illustrating the manner of attachment of the bracket, handle and clamp thereto.

In the drawing, the numeral 1 designates a spring band terminating in clamping flanges 2, having indentations 3 forming beads projecting inwardly in juxtaposed relation. The spring band 1 is adapted to be looped over a utensil such as the glass coffee maker 4, Fig. 4, which are constructed with a shoulder or flare as shown to prevent displacement of the spring band when assembled thereon.

The numeral 5 designates a handle or grip of wood or plastic materials having cut-out portions 6 and indents 7, Fig. 3, complementary in shape to the parallel ends 2 of the spring band and to the beads 3 thereof.

The spring band and handle are held in place by a clamp consisting of a rectangular metal strip 8 that envelops the handle and band ends, as shown in Fig. 3.

The member 8 is a bifurcated member having parallel depending flanges 9 to which is secured a lever 10 that is pivotally joined to the flanges 9 by a rivet 11.

The structure is assembled by looping the spring band over the container. The clamp 8 is then slipped over the ends 2 of the band and the handle 5 is inserted in the clip with the slots of the handle engaging the ends 2 of the band, and the beads 3 of the band ends fitting into the depressions 7 of the handle.

The tapered lever 11 is then folded over the depending flange elements 9 to the position shown in Fig. 4 and when pressed into place the assembly is complete.

Tolerances are taken up by the clip rider that is bent into the two sides of the ends 2 which when put under pressure by the lever 10 hold the band and handle tightly together by a natural spring tension, which at all times maintains contact between the band ends and handle member.

By means of this construction, drilled holes, screws and nuts commonly employed on handle and band assemblies are eliminated, and no tools are required to assemble the parts.

Although one embodiment of the invention has been herein illustrated and described, it will be evident to those skilled in the art that various modifications may be made in the details of construction without departing from the principles herein set forth.

I claim:

1. In combination, a bifurcated spring band for enveloping a food container having its loose ends extending radially for engaging a handle therebetween, said ends having indents forming juxtaposed projections, a handle disposed between said band ends having depressions for receiving said projections and a clamp enveloping said band ends and handle, and having a tapered lever for interlocking said band, handle and clamp.

2. In combination, a bifurcated spring band for enveloping a food container having its loose ends extending radially for engaging a handle therebetween, said ends having indents forming juxtaposed projections, a handle disposed between said band ends having parallel grooves and depressions for receiving said band ends and projections thereof, and a clamp enveloping said band ends and handle and having a tapered lever for interlocking said band, handle and clamp.

3. In combination, a bifurcated spring band for enveloping a food container having its loose ends extending radially for engaging a handle therebetween, said ends having indents forming juxtaposed projections, a handle disposed between said band ends having depressions for receiving said projections and a clamp comprising a bifurcated rectangular member for yieldingly engaging said band ends and handle and having a lever pivoted on the free ends thereof, to clamp said ends to interlock the aforementioned assembled parts.

LOUIS POGLEIN.